United States Patent [19]
Guth

[11] 3,850,185
[45] Nov. 26, 1974

[54] MEANS IN A DISHWASHING MACHINE FOR STARTING THE OPERATIONAL CYCLE THEREOF

[75] Inventor: Lauren W. Guth, Louisville, Ky.

[73] Assignee: General Electric Company, Louisville, Ky.

[22] Filed: May 31, 1973

[21] Appl. No.: 365,453

[52] U.S. Cl. ............... 134/58 DL, 134/93, 222/70, 292/DIG. 69
[51] Int. Cl. ............................................. B08b 3/02
[58] Field of Search ............. 134/57 DL, 58 DL, 93; 222/70; 292/DIG. 69

[56] References Cited
UNITED STATES PATENTS

| | | | |
|---|---|---|---|
| 2,278,268 | 3/1942 | Kempton ...................... | 134/57 DL |
| 3,028,870 | 4/1962 | Fay .............................. | 134/58 DL |
| 3,409,320 | 11/1968 | Eckerle ..................... | 292/DIG. 69 X |
| 3,419,190 | 12/1968 | Kauffman et al. .............. | 134/93 X |

*Primary Examiner*—Robert L. Bleutge
*Attorney, Agent, or Firm*—Francis H. Boos

[57] ABSTRACT

In a dishwasher of the type having an access door leading to a wash chamber and a sequence control mechanism for sequentially operating components of the dishwasher to complete a programmed washing cycle of operation, control mechanism is provided for the machine including pre-settable apparatus in the form of a treating agent dispensing device having a manually closable container portion disposed to communicate, when open, with the wash chamber and adapted to be triggered by the sequence control mechanism to open at a predetermined time during the machine's operational cycle. The control mechanism further comprises a switch in series with the sequence control mechanism which, when open, normally prevents energization of the sequence control mechanism. This first switch is adapted to be closed by the action of manually closing the container portion of the treating agent dispensing device. A second switch, commonly referred to as a door safety switch, when closed by manipulation of the door latch, completes an electrical circuit through the first switch to the sequence control mechanism whereby the sequence control automatically goes into operation.

9 Claims, 3 Drawing Figures

3,850,185

MEANS IN A DISHWASHING MACHINE FOR STARTING THE OPERATIONAL CYCLE THEREOF

BACKGROUND OF THE INVENTION

The typical domestic dishwashing machine utilizes a sequence control means including a series of cams rotated by a synchronous motor to open and close various switches in a predetermined pattern whereby electrically energizable components of the machine are sequentially operated to complete a full cycle of operation. Usually, a control knob on the outside of the machine's cabinet is utilized by the machine operator to start the cycles. The control knob is usually mounted on a rotatable shaft geared to a main shaft of the sequence control means in the machine whereby rotary manual advancement of the knob a short distance causes a cam operated switch to close and energize the synchronous motor of the sequence control means. The knob, because of its interconnection to the main shaft of the sequence control means, will thereafter rotate slowly during the operational cycle to indicate visually, by its advancement relative to indicia provided circumjacent the knob, the portion of the cycle that has been completed at any given time. Alternatively, the sequence control means in some dishwashing machines requires that the operator push or pull on the knob so that such motion is translated to close a switch and thereby start the synchronous motor into operation.

A sequence control means on a dishwashing machine is a relatively expensive item among the components in the machine. The cost of such an item is proportionate to the number of energizable components in the machine operated thereby; a corresponding camming arrangement and accompanying switch or switches is needed for each component. Obviously, it is highly desirable to reduce the cost of such an item, particularly if such cost reduction includes provision of an otherwise new and very desirable feature on the machine.

It is typical in an automatic dishwashing machine to have pre-settable apparatus such as a dispensing device disposed in communication with the washing chamber and arranged to be triggered by the sequence control means during the operational cycle of the machine whereby a detergent container portion is caused to open and dispense its load into the washing chamber at a predetermined time. Frequently, the operator of the machine will neglect to put detergent into the dispensing device prior to operation thereof. On the type of dishwasher wherein a dispensing device is mounted on a front-opening access door, it is not uncommon for the operator to fill the open container portion of the dispensing device with detergent and then inadvertently fail to close the container portion. This results in having the detergent spilled into the wash chamber immediately upon closing the chamber's access door. Inadvertent errors of the type heretofore described will result in improper washing of the dishes stored in a dishwasher's chamber, and this is a condition that will only be discovered after the machine has operated fully through its entire cycle.

The present invention comprehends the provision of a control means for an automatic dishwashing machine whereby the operational cycle of the machine is instigated in response to closing and latching of the access door to the wash chamber. Manual closing of pre-settable apparatus, preferably a closable container portion of a dispensing device, is required to obtain the aforedescribed semi-automatic starting function. This feature on a dishwashing machine enables use of a simplified, comparatively low-cost sequence control means since means to actuate the cycle through manual advancement of the control knob portion thereof is not required. Moreover, this invention and its use makes it quite unlikely that the machine's operator will overlook filling or closing of a closable dispensing device before using the machine.

SUMMARY OF THE INVENTION

A control means including a special switching arrangement is provided on the type of automatic dishwashing machine having an access door leading to a wash chamber and having a dispensing device disposed to dispense a treating agent from a closable container portion into the wash chamber at a predetermined time in accordance with the program of the machine's sequence control means. The switching arrangement includes a first switch adapted to be closed as an incident of the container portion of the dispensing device being manually closed by the machine operator. Closing of the first switch places the machine's control circuit in condition whereby, when the access door of the machine is closed over the wash chamber and latched in closed position, a second switch is caused to close by manipulation of the door latch whereby the machine's sequence control means is energized to begin the operational cycle. The first switch has means therewith for shunting it from the energizing circuit of the sequence control means whereby, when the dispensing device is automatically tripped by the sequence control means during the operational cycle to uncover the container portion and dispense detergent, the resulting opening of the first switch as an incident of the dispensing action has no effect on the ongoing operation of the machine as it completes its cycle.

DETAILED DESCRIPTION OF THE PREFERRED EMBODIMENT

Figure 1:
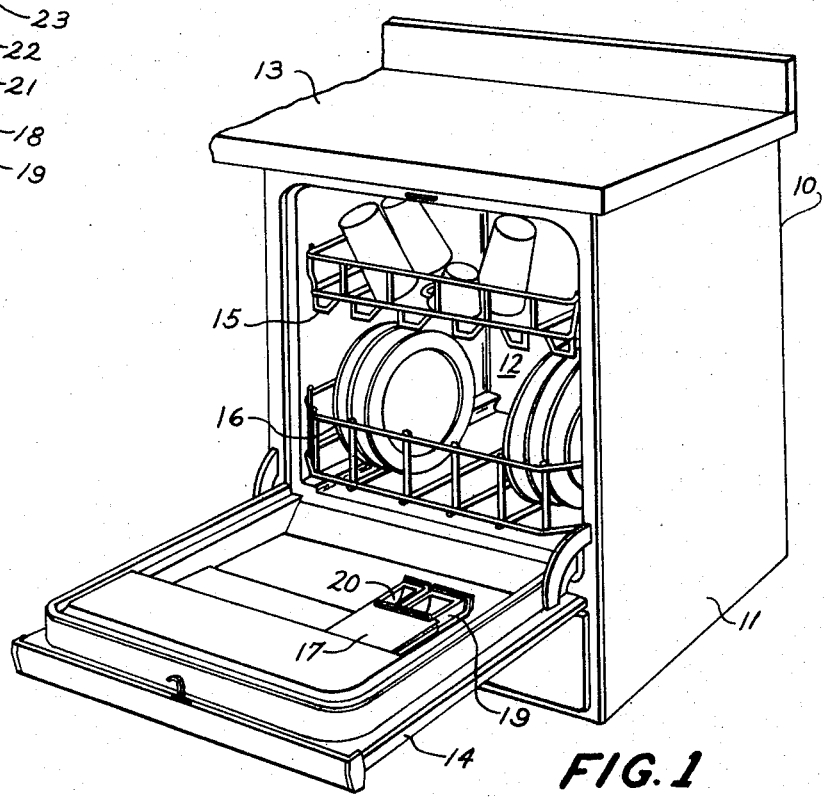
FIG. 1 is a perspective view of a dishwashing machine in accordance with the present invention.

In FIG. 1 there is illustrated an automatic dishwashing machine 10 having an outer cabinet 11 defining therein a wash chamber 12. Dishwasher 10 may be of the undercounter type wherein it would be built into the kitchen cabinet with a conventional kitchen countertop 13 disposed thereabove. A large access opening is provided in one wall of cabinet 11 to provide access to wash chamber 12. A closure member or door 14 is provided to close the access opening to prevent the escape of liquid therethrough during operation of the dishwasher 10. Door 14 is pivotal about its lower edge between an open position, as shown in FIG. 1, and a substantially vertical closed position.

Disposed within the wash chamber 12 are a pair of dish-supporting racks 15 and 16 which are adapted to receive and support items to be washed within wash chamber 12. Racks 15 and 16 are supported whereby they may be at least partially withdrawn from wash chamber 12 through the access opening to facilitate loading and unloading of the items to be washed. A typical dishwasher, such as the dishwasher 10, generally would include certain elements which are not specifically shown in the drawing. These would include a water valve means to control the admission of water to the wash chamber 12, an electric motor and pump assembly to effectuate a washing action within the wash chamber 12 by recirculating spraying liquids to the items within the racks 15 and 16 and to drain the wash chamber 12 whereby soiled liquid would be conducted to the household sewer system. The wash chamber 12 would also normally contain an electrical resistance heating element to enable drying of the items upon completion of the normal wash and rinse operations in the machine's operational cycle. The foregoing components are not shown or discussed in detail since they are well known in the art and may be conventional for the purpose of the present invention.

The programmed cycle of operation of the dishwasher 10 would include an initial charge of water to the wash chamber 12 followed by energization of the motor and pump assembly wherein the water is recirculated from and to the wash chamber 12 to complete a pre-rinse operation or step in the cycle. After a predetermined time interval the motor and pump assembly is caused to drain the water from wash chamber 12, thus completing the pre-rinse. The first pre-rinse step may be followed by a second rinsing step and then by a wash step which is substantially identical to the pre-rinse except it is generally of a longer duration and includes the automatic admission of detergent or similar treating agent, from a dispensing device 17, to the water within the wash chamber 12. The wash operation is thereafter followed by one or more post rinses, then a drying operation during which the electrical resistance heating element is energized to cause convection drying currents of air to move through the wash chamber 12 through upper and lower vents not illustrated in the drawing.

Figure 2:
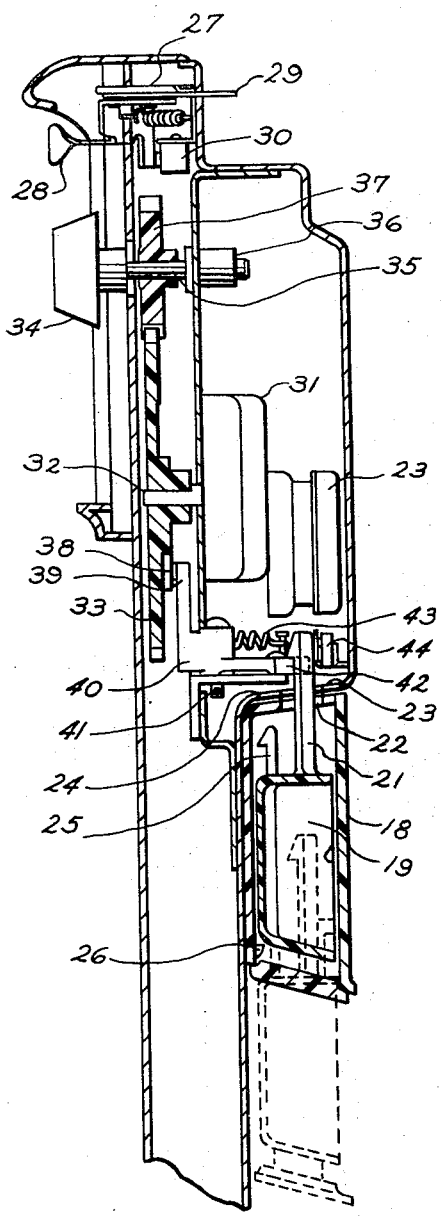
FIG. 2 is a view in vertical section of a portion of the access door of the dishwashing machine first shown in FIG. 1.

The dispensing device 17 is provided to enable automatic dispensing of treating agent such as detergent into the wash chamber 12 in response to action of the sequence control means of the machine. The dispensing device 17, as shown in FIG. 2, includes a housing 18 mounted to the door 14. Mounted for movement relative to the housing 18 is a relatively large closable container portion 19 and an adjacent relatively smaller container portion 20. Each of the container portions 19 and 20 are individually movable between a first position wherein they are substantially totally enclosed within housing 18 and a second open position wherein they are substantially totally outside the housing 18. The housing 18, as shown in FIG. 2, has an opening through one wall thereof which faces downwardly when the door 14 is in its closed position, and container portions 19 and 20 slidably move between the first and second positions through this opening. Container portions 19 and 20 can be conveniently filled with granular detergent when door 14 is in its open position since the open side of each container portion faces upwardly when the door 14 is open as illustrated in FIG. 1.

Once the container portions 19 and 20 have been filled with detergent they can be manually slid to the position shown generally in solid lines in FIG. 2 wherein they are substantially totally within the housing 18 so that liquid being moved about within the wash chamber 12 will not enter and contact the detergent within the respective container portions. Housing 18 is designed to retain the detergent within the containers even though the door 14 is pivoted through 90° to its closed position.

Container 19 has a hook-like element or tongue 21 which projects through opening 22 in housing 18 and an opening 23 in an inner wall 24 of door 14. Container portion 20 has a similar tongue extending therefrom which cannot be seen in FIG. 2 because it would be disposed rearwardly of the tongue 21. Each of the container portions 19 and 20 also have relatively smaller projecting tongues such as 25 disposed to engage a boss such as 26 to prevent the container portion from moving entirely outwardly away from the housing 18.

Shown in the upper portion of the dishwasher door 14 in FIG. 2 is a latch mechanism 27 that is manipulated by a latch handle 28 to cause a latching finger 29 to engage a strike in the cabinet 11 above the access opening to the chamber 12. An electrical switch 30 is mounted adjacent the latching mechanism 27 and is adapted to respond to opening and closing of the latch mechanism. When the latch handle 28 is manipulated to open the access door this action causes a camming action in the mechanism 27 to open the latch 30. When the latch handle 28 is manipulated to lock the door 14 it its closed position, this action causes the latch 30 to close. The purpose of this electrical switch 30 will be described in more detail hereinafter in reference to FIG. 3.

Also illustrated in the upper end of the dishwasher door 14 in FIG. 2 is the machine's sequence control means comprising a synchronous motor 31 having a rotatable shaft 32. The shaft 32 extends forwardly toward the front side of the door 14 and has a camming wheel 33 fixedly mounted on the shaft for rotation therewith. The opposite or rearwardly extending portion of shaft 32 (not shown) operates a series of rotatable cams located in casing 23. Also within the casing 23 are cam actuated switches adapted to be operated sequentially to energize and de-energize various components of the dishwashing machine to complete its operational cycle. Also shown in FIG. 2 is a control knob 34 mounted to a shaft 35 that is rotatably mounted in a journal 36. Carried on the shaft 35 for rotation therewith is a gear wheel 37 having peripheral teeth for meshing with similar teeth on the outer edge of the camming wheel 33. The camming wheel 33 also has a lobe or camming surface 38 for camming against a projecting finger portion 39 of a lever 40. The lever 40 is adapted to pivot on a pivot pin 41 shown in a vertical orientation in FIG. 2 and has a rearwardly extending leg 42 on which the tongue 21 of container portion 19 (and a similar tongue of container portion 20) engages. A spring biasing means 43 is provided to hold the lever element 40 in position to hold the container portions 19 and 20 in the retracted position except when the lever 40 is caused to pivot at a predetermined time and a predetermined number of degrees during the operational cycle by rotational movement of the camming wheel 33 and its lobe 38. It should be understood that the separate container portions 19 and 20 are opened to dispense their load at respectively different times during the machine's cycle. One container portion is released to dispense before the other as the lever 40 is pivoted slowly by the lobe 38 of wheel 33.

Mounted in the door 14 adjacent the end of tongue 21 is an electrical switch 44 adapted to be contacted by tongue 21. Closing of the container portion 19, such that the tongue 21 moves upwardly to engage leg 42 of lever 40 and to contact the switch 44, causes the electrical contacts thereof to close, and release of the tongue 21 by the lever 40, whereby the container portion 19 opens by sliding outward movement thereof relative to the housing 18, causes the tongue 21 to move away from the switch 44 whereby the contacts of the switch are opened.

It should be understood that the detergent dispensing device, the sequence control means, and the latching arrangement for the door 14 thus far described are structural arrangements generally known in the art. More specific details of the operation of the dispensing device 17 can be obtained by reference to U.S. Pat. No. 3,419,190 issued to M. R. Kauffman et al on Dec. 31, 1968. Details of the structure and operation of the latch mechanism described with reference to FIG. 2 may be obtained from U.S. Pat. No. 3,409,320 issued to W. A. Eckerle on Nov. 5, 1968.

In accordance with the present invention, the switch 44 is provided adjacent the detergent dispensing device 17 whereby it is actuated to close by the manual closing of container portion 19 and is adapted to open by the automatic opening of the container portion 19, with the automatic opening thereof being caused mechanically by the operation of the sequence control means. The function of switch 44 and its relationship to the latch actuated switch 30 will be best understood from a description of the operation of a dishwashing machine by reference to the schematic representation of the control circuitry of the machine as shown in FIG. 3.

Figure 3:
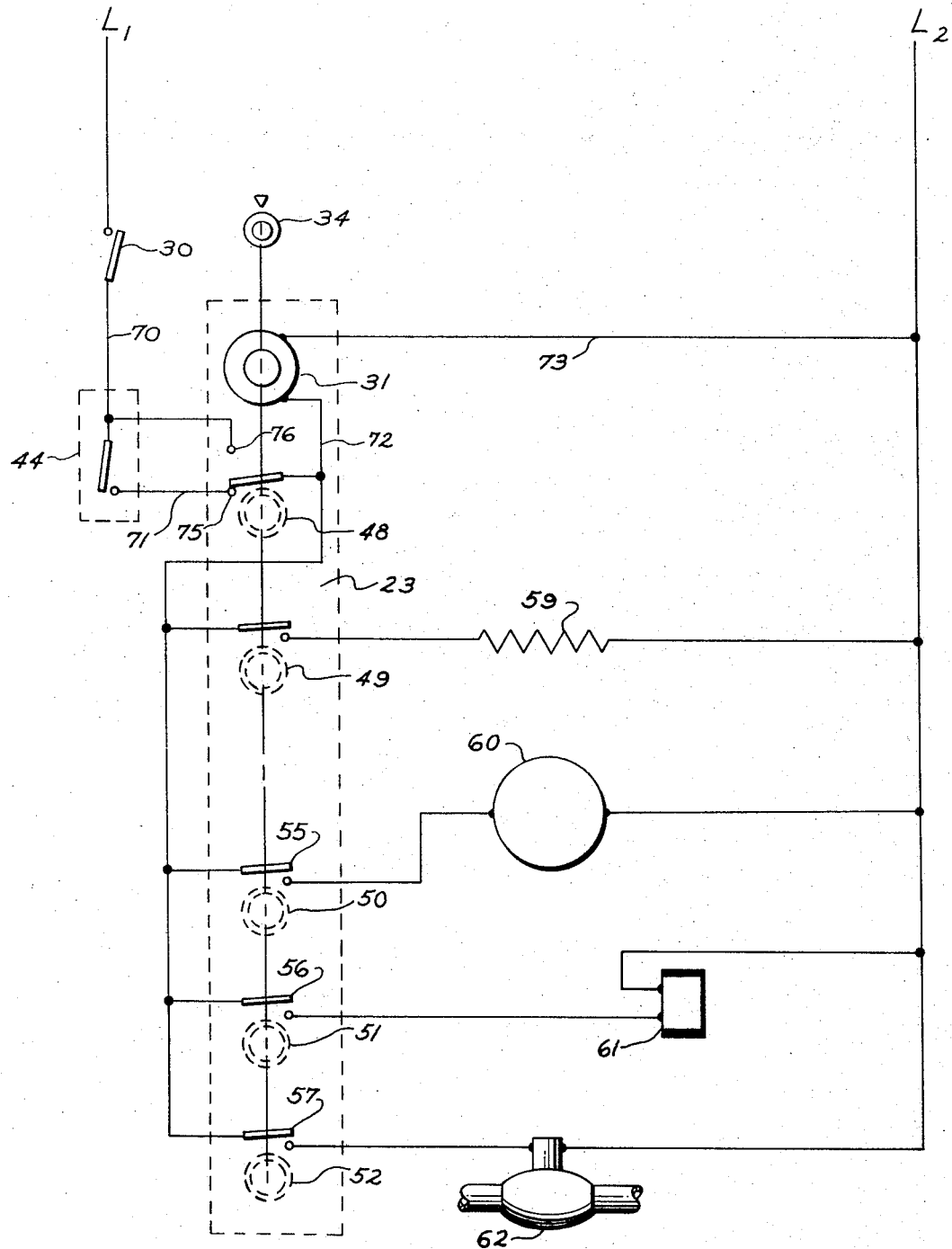
FIG. 3 is a schematic representation of control circuitry for a dishwashing machine in accordance with the present invention.

Illustrated in FIG. 3 are conductors L1 and L2 for providing electrical power to operate a dishwasher of the type shown in FIG. 1. The sequence control means of the dishwasher is shown in FIG. 3 as comprising the control knob 34 which is operatively connected (as clearly shown in FIG. 2) to rotate with the shaft of synchronous timer motor 31. The casing 23 shown in FIG. 2 is represented in FIG. 3 by an elongated dotted line rectangle assigned the same numeral designation as the casing. This casing is illustrated schematically in FIG. 3 as containing rotatable cams 48–52 which respectively actuate component switches 53–57. In the circuitry arrangement shown, switches 54, 55, 56 and 57 are adapted to respectively control the energization of machine components 59, 60, 61 and 62. Component 59 is the electrical resistance element for providing heat to accomplish the drying step of the machine's cycle, component 60 is the motor-pump assembly for accomplishing liquid recirculation during the rinsing and washing steps of the cycle, component 61 is a solenoid for operating a valve in the pump to effect draining of the wash chamber after each rinsing and washing step of the cycle, and component 62 is a water inlet valve for conducting fresh water into the wash chamber. The aforementioned components 59–62 in FIG. 3 are those components described hereinbefore generally with reference to FIG. 1 but not specifically shown in the dishwasher illustrated in FIG. 1. Also shown in FIG. 3 is the switch 44 which is caused to close its contacts as an incident of the detergent container portion 19 (FIG. 2) being manually closed. The contacts of switch 44 open as an incident of the detergent container portion 19 sliding to its open position when triggered mechanically by the sequence control means. A switch 53, actuated by cam 48 is also shown in FIG. 3 and serves the purpose of shunting switch 44 from the energizing circuit to the sequence control means motor during the major portion of the operational cycle of the machine for a purpose that will be understood from the functional description hereafter.

When the machine operator desires to wash a load of soiled dishes in the dishwasher 10 shown in FIG. 1, the soiled dishes are loaded to the racks 15 and 16 after which treating agent, generally a powdered detergent, is placed into one or both of the container portions 19 and 20 of the dispensing device 17. The container portion 19, which is substantially larger than the adjacent container portion 20, is considered the main detergent drawer or cup and is generally utilized for dispensing detergent during a normal washing cycle. The smaller container portion 20 may be optionally filled when it is desired to provide more than one washing step during the operational cycle. When both container portions are utilized, a normal rinsing step is converted to a washing step due to the dispensing of detergent from the smaller or secondary container portion which dispenses at a different time during the operational cycle than does the main container portion 19.

When detergent has been placed into container portion 19, the operator slides the container portion into the closed position within the housing 18 whereby the tongue 21 engages over the leg of lever 40 to hold the container portion in the closed position. Then the operator swings the door 14 to its upright vertical position across the access opening of the wash chamber 12 and manipulates latch 28 to seal the door 14 closed. With references to FIG. 3, it will be seen that the aforedescribed action of the machine operator has the following effect. Closing of the container portion 19 causes switch 44 to close. Then, latching the door 14 has the effect of closing the switch 30 which is a safety switch preventing operation of the machine unless the door 14 is in the closed and latched position. Manipulating the latch handle 28, as described to seal door 14, automatically instigates the operation of the sequence control means of the machine whereby the operational cycle of the machine commences and continues through to its completion.

By tracing the circuitry shown in FIG. 3, the manner in which the aforementioned function is accomplished through a preferred switching arrangement will be understood. Prior to being placed in operation, the various switches of the circuitry of the dishwashing machine are disposed substantially as illustrated in FIG. 3. The latch of the access door of the machine is open whereby electrical contacts of the safety switch 30 are open. Moreover, detergent container portion 19 (see FIGS. 1 and 2) is open and ready to be filled by the operator so the contacts of switch 44 are also open. Tracing the circuit from $L_1$ through switch 30, thence through a conductor 70 leading from switch 30 to switch 44, thence through a conductor 71 leading from switch 44 to switch 53, and finally through a conductor 72 leading from switch 53 to synchronous motor 31, it should be evident that when the contacts of switches 30 and 44 are closed an energizing circuit through synchronous motor 31 will be completed whereby the operational cycle of the dishwashing machine will be instigated.

In preparing the machine for use, the act of closing of the container portion 20 of the dispensing device 17 by the operator has the effect of closing switch 44 whereby the circuit is placed in condition to be completed to the synchronous motor 31 when switch 30 is caused to close. Therefore, when the operator moves the access door of the wash chamber of the dishwashing machine to the closed position and manipulates the latch thereof to seal the door in position, switch 30 is cammed closed by the latching mechanism whereby motor 31 is immediately energized.

Shortly after motor 31 is energized, cam 48 causes switch 53 to break away from a contact 75 and close with a contact 76. Switch 53 is preferably of the "make before break" type of wiper switch whereby the circuit through contact 76 is completed before the circuit through contact 75 is broken. The aforementioned action of switch 53 serves to shunt switch 44 from the energizing circuit whereby the motor 31 continues to operate but switch 44 is no longer in the circuit to effect the operation of the machine when, during the wash step of the cycle, the container portion 20 is triggered to open mechanically through the aforedescribed structure shown in FIG. 2. If switch 44 were allowed to remain in the motor energizing circuit, the opening of the container portion 20 and the consequent opening of the contacts of switch 44 would have the undesirable effect of de-energizing the motor 31. After the various rinse, wash, and the final drying steps have been completed during which the synchronous motor 31 has advanced the various cams shown in FIG. 3 to energize the operative components of the machine in the desired predetermined sequence, the cycle is terminated by cam 48 causing switch 53 to break with contact 76 whereby the synchronous motor 31 is de-energized. When the switch 53 breaks from contact 76 it moves into contact at 75 whereby switch 44 is again in series between switch 30 and motor 31. The switching arrangement is thus predisposed for later use in cleaning a new load of soiled dishes.

It is contemplated that the control means or switching arrangement herein disclosed for obtaining semi-automatic starting of a dishwashing machine cycle may be utilized with types of pre-settable apparatus different from the dispensing device described and illustrated. Also, other structurally different dispensing devices may be employed without departing from the control means invention. Some detergent dispensing devices employ a pivotal cover over a stationary container and still others utilize a pivotal container which is moved to dispense by pivoting away from a fixed cover. Moreover, various means of triggering a dispensing device may be employed in accordance with the present invention. While the illustrated embodiment utilizes a mechanical means of translating movement from a sequence control m eans to the dispensing device, there are other means of achieving the dispensing action such as an electrically energized bimetal triggering element or solenoid. Any such devices, or modifications thereof, may be adapted to open and close a switch such as 44 as an incident of movement of an element of the device to accomplish the function of the present invention.

I claim:

1. In an automatic dishwashing machine having a wash chamber with a latchable access door and an electrically energizable sequence control means for conducting the machine through its operational cycle, the improvement therewith comprising a switching arrangement adapted to respond to manual latching of the access door such that initial energization of the sequence control means to begin the cycle occurs as an incident of the latching action, a manually pre-settable dispensing apparatus disposed to be in communication with the wash chamber and adapted to dispense during the cycle, and wherein the switching arrangement includes a first switch in the energizing circuit of the sequence control means, and the first switch being adapted to be opened as a function of the dispensing of the dispensing apparatus and closable in response to the dispensing apparatus being pre-set.

2. The invention of claim 1 further including a second switch in series between the first switch and the sequence control means, and the second switch being adapted to be opened and closed as an incident of manipulation of the door latch.

3. The invention of claim 2 further including means for bypassing the second switch during the major portion of the cycle and means for replacing the second switch in series between the first switch and the sequence control means substantially at the end of the cycle.

4. In a dishwasher of the type having a wash chamber for storage of items to be washed therein, an access door to the chamber, electrically energizable components including a sequence control means for sequentially operating the components to thereby complete a programmed washing cycle of operation, a treating agent dispensing device having a manually closable container portion disposed to communicate, when open, with the wash chamber and adapted to open at a predetermined time during the operational cycle in response to the sequence control means, the improvement therewith comprising: a control circuit for the sequence control means including a first switch in series with the sequence control means across an electrical power source, the first switch being adapted to be opened as an incident of the treating agent dispensing container portion being opened, the first switch, when open, preventing energization of the sequence control means and being closable as an incident of closing said container portion, a second switch in series between the first switch and the sequence control means and adapted to be manually caused to open and close whereby, when the first switch is closed in response to manual closing of the container portion, the sequence control means can be energized by the closing of the second switch.

5. The invention of claim 4 wherein the second switch is located adjacent the treating agent dispensing device.

6. The invention of claim 4 further including latch means for locking the access door in a closed position, and wherein the second switch is adapted to be opened and closed by manual actuation of the latch means.

7. The invention of claim 4 further including automatic means for shunting the second switch from the control circuit prior to opening of the container portion to thereby prevent the interruption of the operational cycle when the container portion is opened.

8. The invention of claim 7 wherein the means for shunting the second switch from the circuit comprises a third switch adapted to be actuated by the sequence control means.

9. The invention of claim 8 wherein the third switch is also adapted to be acutated by the sequence control means to terminate the cycle.

* * * * *